No. 664,102. Patented Dec. 18, 1900.
P. T. SIEVERT.
APPARATUS FOR MANUFACTURING HOLLOW GLASS ARTICLES.
(Application filed Dec. 29, 1899.)
(No Model.) 2 Sheets—Sheet 1.

Inventor:
Paul Theodor Sievert
by attorneys
Brown & Swan

Witnesses:
George Barry, Jr.
Edward Friesen

No. 664,102. Patented Dec. 18, 1900.
P. T. SIEVERT.
APPARATUS FOR MANUFACTURING HOLLOW GLASS ARTICLES.
(Application filed Dec. 29, 1899.)
(No Model.) 2 Sheets—Sheet 2.
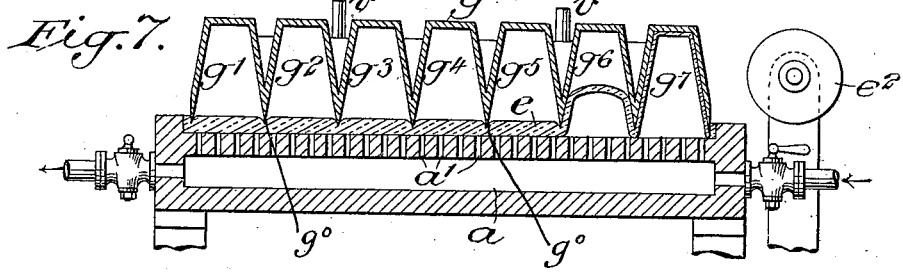
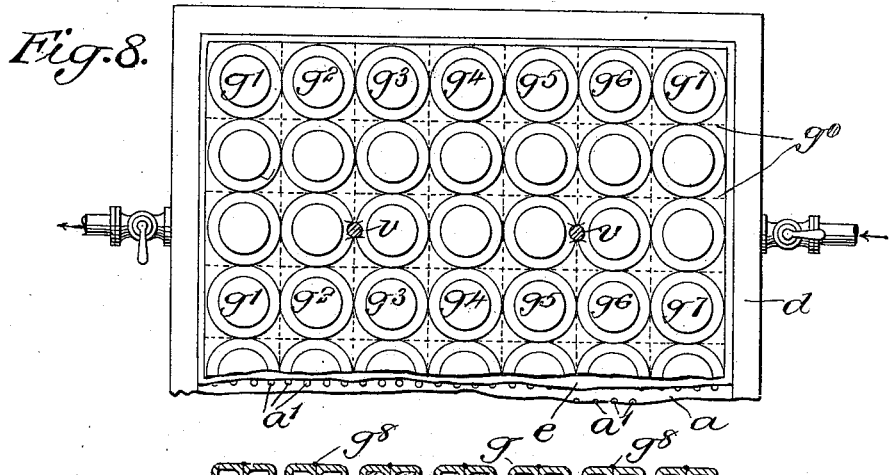
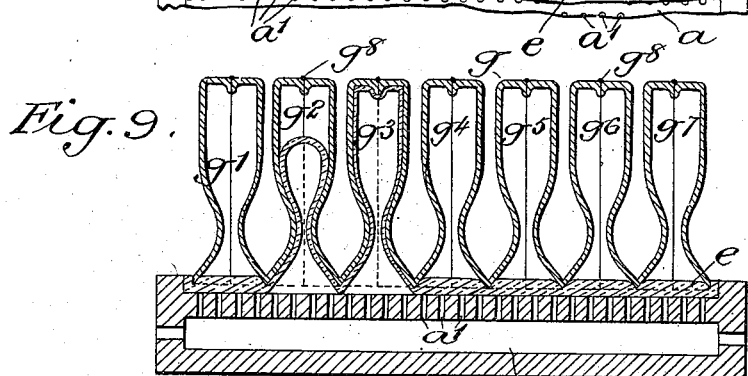
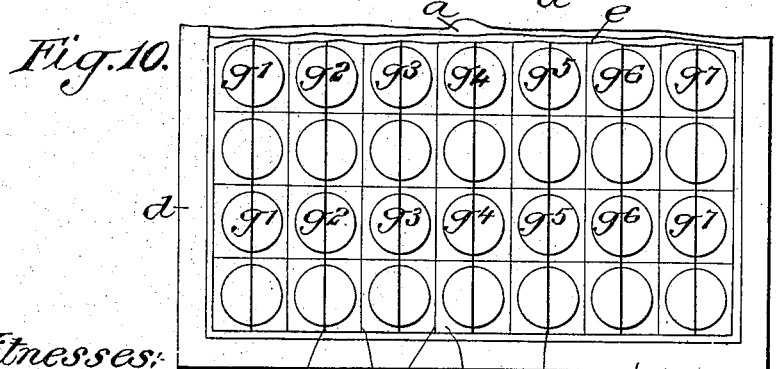
Witnesses:
George Barry Jr.
Edward Vieser.
Inventor:
Paul Theodor Sievert
by attorneys
Brown & Heward

UNITED STATES PATENT OFFICE.

PAUL THEODOR SIEVERT, OF DRESDEN, GERMANY.

APPARATUS FOR MANUFACTURING HOLLOW GLASS ARTICLES.

SPECIFICATION forming part of Letters Patent No. 664,102, dated December 18, 1900.

Original application filed January 31, 1899, Serial No. 704,054. Divided and this application filed December 29, 1899. Serial No. 741,898. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Manufacture of Hollow Glass Articles, of which the following is a specification.

This improvement relates to apparatus employed for performing a process for manufacturing hollow glass articles, which is the subject of my United States Patent No. 651,059, dated June 5, 1900.

An apparatus embodying the present invention consists principally of a hollow slab or plate, in which are one or more perforations and upon which the molten glass is to be spread out as a plastic layer, and a hollow mold, either single or multiple and either all in one piece or divided, which holds the said layer only at its edges or on any determined outline or outlines circumscribing a portion or portions of said layer while an elastic pressure medium introduced through said slab or plate and issuing from its perforation or perforations blows out the said layer within the interior of the mold into a form corresponding therewith.

The invention is illustrated with various modifications of which it is susceptible in the accompanying drawings, in which—

Figure 1:
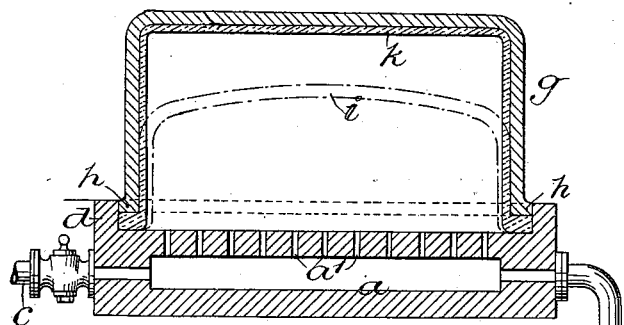
Figure 2:
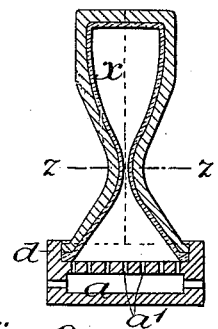
Figure 3:
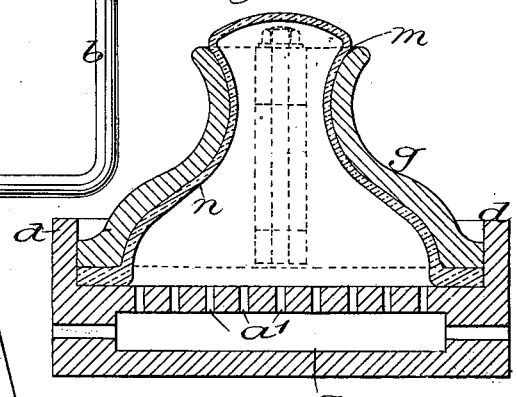
Figure 4:
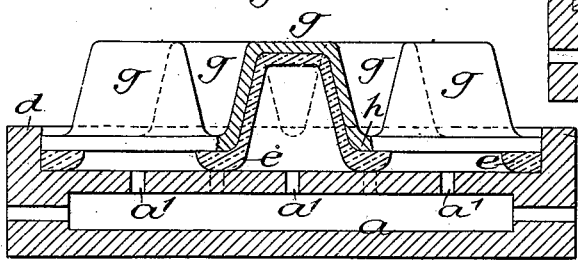
Figure 6:
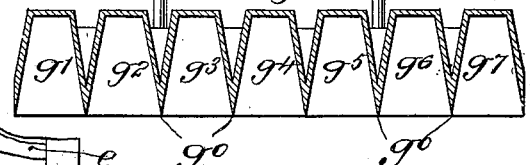
Figure 5:
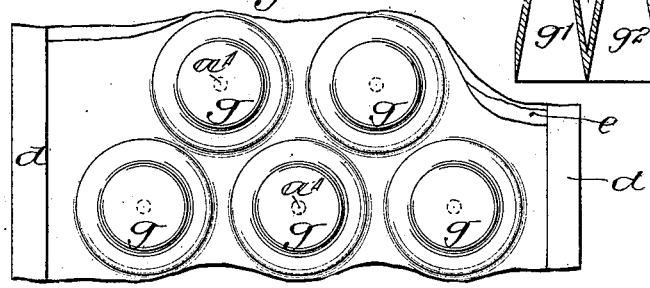

Figures 1, 2, and 3 represent, respectively, central vertical sections of three different examples of apparatus embodying my invention, each provided with a single hollow mold into which the glass is to be blown. Fig. 4 represents a central vertical section of an apparatus provided with a multiple hollow mold for the blowing up of the spread-out molten glass layer to form simultaneously several hollow articles; Fig. 5, a partial plan corresponding with Fig. 4; Fig. 6, a vertical sectional view of a multiple hollow mold adapted for use on the hollow slab; Fig. 7, a vertical sectional view of the slab with molds like those shown in Fig. 6 upon the glass layer; Fig. 8, a partial plan corresponding with Fig. 7; Fig. 9, a vertical sectional view of a slab like that shown in Fig. 7 with a divided multiple mold for a number of bottles; Fig. 10, a partial plan corresponding with Fig. 9.

Referring first to Figs. 1, 2, and 3, in which a single mold is represented, $a$ is the hollow slab or plate, which will be hereinafter termed the "slab," in communication with the internal cavity of which there are, as shown in Fig. 1, an inlet-pipe $b$ and an outlet-pipe $c$, each provided for the regulation of the tension of the elastic pressure medium. The said slab may be of any suitable contour corresponding with the contour of the hollow article or body to be produced. It has around it an upwardly-projecting rim $d$, which forms above its face a shallow chamber for the reception of the layer of molten glass. The face has in it any number of perforations, one or more, for the issue of the elastic pressure medium from the internal cavity of the slab to blow out the glass. In Fig. 1 a compressor $l$ is shown connected with the inlet-pipe $b$ for supplying the elastic pressure medium.

$g$ is the mold, of any suitable material, as metal, having its contour and side profile of the form of the hollow article to be produced. The open bottom of this mold is represented as fitted within the rim $d$ of the slab to keep it in place thereon. The edges of the mold may be held down upon the layer of molten glass on the slab by any suitable means, as by its own weight. In Fig. 1 the mold is closed at the top and has straight sides to produce an article $k$, of box-like form, which is shown at $i$ in dotted lines in Fig. 1 as partly blown up. In Fig. 2 the mold is represented as closed at the top and having a narrow throat to produce a bottle or similar article $x$ and has a funnel-shaped mouthpiece, the larger diameter of which rests on the glass layer and holds the latter firmly by its margin. The hollow body formed in this mold by blowing up the glass into it is to be cut or divided on the line $z$ to produce the bottle or article with contracted mouth. The mold shown in Fig. 3, which is for producing an article $n$, having an irregular profile, is open at the top, as represented at $m$. This opening $m$ is to allow the pressure in the mold to be relieved by a bursting through of the glass thereat when the mold has been filled by the blowing out of the glass layer into a hollow article. The molds shown in Figs. 2 and 3 must be divisible along their side profiles to permit the removal of the blown-glass articles from them.

In Figs. 4 and 5 is shown a multiple mold embodying in one piece several single molds $g\ g$ for the simultaneous manufacture of several objects—tumblers, for example. This multiple mold when applied to the layer of glass $e$ on the slab holds the glass layer down in circular lines by the edges of its separate molds $g\ g$, and those portions of the glass layer which lie within these lines are blown up and fill the separate molds. Naturally after the manufacture of the various objects here given as examples the separation of the remaining firmly-held glass mass is best effected by breakage at the point where the blowing of the thin walls begins. To facilitate the removal of the superfluous glass mass from the manufactured articles, the lower edges $h$ of the molds $g$ may be sharp-edged or beveled, as shown in Figs. 6, 7, and 9. The sharp edges penetrate the glass layer, but hold it sufficiently firmly and facilitate the removal of the superfluous glass mass. Single molds $g$, such as are shown in Figs. 1, 2, and 3, might also have their edges similarly sharp or beveled.

In order to effect economy in glass between the molds, single or connected molds having their edges of polygonal outline may be made to cover the entire glass layer $e$, each mold covering enough of the glass mass to suffice for the manufacture of one hollow article. An example of this is shown in Figs. 6 to 10, inclusive.

Over the glass layer hangs the vertically-movable multiple mold $g$, Fig. 6, which is held by the stems $v$ and which consists of a group or series of associated molds—here, for example, for tumblers. The lower parts of these molds, which are open for the entrance of the glass, are spread out to such polygonal outline—quadrangular, for example, as indicated by the lines $g^0$ in Figs. 8 and 10—that the edges of the adjacent molds are contiguous throughout the series, and the said edges are so sharp or thin, as shown at $g^0$ in Figs. 6 and 7, that the edges of each mold form also the edges of adjacent ones and that the openings of the aggregated molds occupy the whole surface of the glass layer, as may be understood by reference to Figs. 8 and 10. In the two molds at the right-hand side of Fig. 7 there is shown in one, $g^6$, the commencement of the blowing-out process; in the other, $g^7$, the completion thereof. After the manufacture each tumbler can be taken out of its own mold and by grinding away or by melting off its rim be completed. A similar arrangement is shown by Fig. 9 (vertical section) and Fig. 10, (plan,) in which the compound mold $g$ is formed by a number of single molds $g'\ g^2\ g^3\ g^4\ g^5$ for the manufacture of bottles. The separate molds are shown arranged in rows, each row consisting of two parts hinged together at $g^8$. Here also the whole surface of the glass layer is completely occupied by the aggregated openings of the several molds of the series. The quadrangular opening of each mold covers enough glass material for the manufacture of a bottle, and after the formation in each mold by blowing up of a glass skin in the shape of a bottle the hinged molds are removed a row at a time and opened for the removal of the manufactured hollow glass articles.

In all the examples of the invention the edges of the molds bear upon the glass on the slab and hold it thereto only on certain circumscribing outlines while the portion or portions of the glass within said outlines are blown out by the elastic pressure medium issuing through the perforations of the slab.

What I claim as my invention is—

1. An apparatus for the manufacture of hollow glass articles consisting of a hollow slab adapted to receive a layer of molten glass and having an inlet for an elastic pressure medium and perforated for the issue of said medium, and a hollow mold for holding said layer on certain circumscribing outlines to said slab while the portion or portions of said layer circumscribed by said outlines are blown out by the elastic pressure medium issuing through the perforations of the slab, substantially as herein described.

2. An apparatus for the manufacture of hollow glass articles consisting of a hollow slab adapted to receive a layer of molten glass and having an inlet for an elastic pressure medium and perforated for the issue of said medium, and a hollow mold having sharp marginal edges for indenting themselves into the glass upon the slab on certain circumscribing outlines and thereby confining the glass to the slab on those outlines while the portion or portions of the glass within said outlines are blown out by the elastic pressure medium issuing through the perforations of the slab, substantially as herein described.

3. In an apparatus for the manufacture of hollow glass articles, the combination with a hollow slab adapted to receive a layer of molten glass and having an inlet for an elastic pressure medium and perforated for the issue of said medium, of a multiple mold composed of a series of hollow molds having sharp or thin edges of polygonal outline and so associated that the edges of the adjacent molds are contiguous throughout, substantially as herein described.

In testimony that I claim the foregoing as my invention I have signed my name, in presence of two witnesses, this 27th day of November, 1899.

PAUL THEODOR SIEVERT.

Witnesses:
 HERNANDO DE SOTO,
 PAUL ARRAS.